United States Patent
Wu et al.

(10) Patent No.: US 10,009,104 B2
(45) Date of Patent: Jun. 26, 2018

(54) UPLINK SIGNAL TRANSMISSION METHOD, PROCESSING DEVICE, AND SYSTEM

(71) Applicant: Huawei Technologies Co., Ltd., Shenzhen (CN)

(72) Inventors: Guangsheng Wu, Shenzhen (CN); Li Zhang, Wuhan (CN); Dao Pan, Johannesburg (ZA); Xiaofeng Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 288 days.

(21) Appl. No.: 15/054,718

(22) Filed: Feb. 26, 2016

(65) Prior Publication Data

US 2016/0182153 A1    Jun. 23, 2016

Related U.S. Application Data

(63) Continuation of application No. PCT/CN2013/082721, filed on Aug. 30, 2013.

(51) Int. Cl.
 *H04J 14/00* (2006.01)
 *H04B 10/2575* (2013.01)
 *H04Q 11/00* (2006.01)

(52) U.S. Cl.
 CPC ..... *H04B 10/2575* (2013.01); *H04Q 11/0066* (2013.01)

(58) Field of Classification Search
 CPC ............ H04B 10/2575; H04B 10/2503; H04B 10/272; H04B 10/572; H04B 15/00;
 (Continued)

(56) References Cited

U.S. PATENT DOCUMENTS

| 7,548,548 B2 * | 6/2009 | Rakib ................. H04L 12/2801 370/419 |
| 8,797,854 B2 * | 8/2014 | Bernstein ........... H04N 7/17309 370/230 |

(Continued)

FOREIGN PATENT DOCUMENTS

| CN | 101213776 A | 7/2008 |
| CN | 101621452 A | 1/2010 |

(Continued)

OTHER PUBLICATIONS

"Radio Frequency over Glass Fiber-to-the-Home Specification," American National Standard, ANSI/SCTE 174 2010, Society of Cable Telecommunications Engineers, 2010, 34 pages.

(Continued)

*Primary Examiner* — Hibret Woldekidan
(74) *Attorney, Agent, or Firm* — Conley Rose, P.C.

(57) ABSTRACT

An uplink signal scheduling method, a processing device, and a system. The method includes when uplink signals sent by at least one transmit device are received, preprocessing the uplink signals, to generate a data over cable service interface specification (DOCSIS) frame, where the DOCSIS frame includes at least two uplink signals, and each uplink signal of the at least two uplink signals corresponds to one uplink wavelength, and when it is detected that a signal conflict exists in the DOCSIS frame, creating at least two signal groups according to the uplink signals, and allocating, to the at least two signal groups, uplink signals that have a same uplink wavelength and cause the signal conflict, and performing scheduling on the uplink signals according to the signal groups that have undergone allocation.

10 Claims, 5 Drawing Sheets

(58) Field of Classification Search
CPC ...... H04B 3/03; H04B 10/0773; H04B 10/27;
H04B 10/25751; H04Q 11/0066; H04J
14/0238; H04J 14/0247; H04J 14/0252;
H04J 14/0257; H04J 14/08; H04J 3/1694;
H04J 14/0298; H04J 14/0282; H04L
12/2801; H04L 41/0896; H04L 12/66;
H04L 47/22; H04L 12/2861; H04L
12/287; H04L 43/0882
USPC .......................... 398/45, 57, 66–72, 75, 115
See application file for complete search history.

(56) References Cited

U.S. PATENT DOCUMENTS

| | | | | |
|---|---|---|---|---|
| 8,842,991 | B2* | 9/2014 | Liang | H04Q 11/0067 398/66 |
| 8,849,108 | B2* | 9/2014 | Pradzynski | H04J 14/0298 398/1 |
| 9,184,847 | B2* | 11/2015 | Luo | H04L 12/2861 |
| 9,455,785 | B2* | 9/2016 | Boyd | H04L 12/2801 |
| 9,503,180 | B2* | 11/2016 | Jin | H04J 14/086 |
| 9,917,648 | B2* | 3/2018 | Maricevic | H04B 10/2575 |
| 2009/0016726 | A1 | 1/2009 | Suzuki et al. | |
| 2010/0083330 | A1* | 4/2010 | Bernstein | H04N 7/17309 725/111 |
| 2011/0078755 | A1* | 3/2011 | Dai | H04H 20/69 725/111 |
| 2012/0257891 | A1 | 10/2012 | Boyd et al. | |
| 2012/0275792 | A1* | 11/2012 | Nandiraju | H04L 12/2801 398/66 |
| 2014/0248054 | A1* | 9/2014 | Wu | H04Q 11/0067 398/66 |
| 2014/0369689 | A1* | 12/2014 | Gadkari | H04L 5/08 398/67 |

FOREIGN PATENT DOCUMENTS

| | | |
|---|---|---|
| CN | 102111693 A | 6/2011 |
| WO | 2010096205 A1 | 8/2010 |

OTHER PUBLICATIONS

Foreign Communication of a Counterpart Application, European Application No. 13892718.1, Extended European Search Report dated Jul. 21, 2016, 10 pages.

Foreign Communication From a Counterpart Application, PCT Application No. PCT/CN2013/082721, English Translation of International Search Report dated Jun. 4, 2014, 2 pages.

Foreign Communication From a Counterpart Application, PCT Application No. PCT/CN2013/082721, English Translation of Written Opinion dated Jun. 4, 2014, 8 pages.

* cited by examiner

UPLINK SIGNAL TRANSMISSION METHOD, PROCESSING DEVICE, AND SYSTEM

CROSS-REFERENCE TO RELATED APPLICATIONS

This application is a continuation of International Application No. PCT/CN2013/082721, filed on Aug. 30, 2013, which is hereby incorporated by reference in its entirety.

TECHNICAL FIELD

The present disclosure relates to the field of communications technologies, and in particular, to an uplink signal transmission method, a processing device, and a system.

BACKGROUND

With continuous development and improvement of communications technologies, operators use optical node splitting in a hybrid fiber-coax (HFC) network, to improve a household average access rate of users. Using the data over cable service interface specification (DOCSIS), the HFC network supports a computer network and a cable television network, and implements transmission of an Internet Protocol (IP) data packet between a transmit device and a cable modem (CM) of the HFC network.

Existing radio frequency over glass (RFoG) technologies can implement that a DOCSIS network is extended from a peripheral unit to a CM of a building user unit using an optical distribution network (ODN). An RFoG network can share an ODN with a passive optical network (PON), and uplink and downlink bandwidths (where the uplink bandwidth is 1610 nanometer (nm), and the downlink bandwidth is 1550 nm) provided by the RFoG network are compatible with uplink and downlink bandwidth (where the uplink bandwidth is 1310 nm, and the downlink bandwidth is 1490 nm) of the PON. A downlink channel of the RFoG network and that of an HFC network are identical and both use a broadcasting transmission service, but a difference lies in burst mode time division multiplexing (TDM) used by an optical network unit (ONU) of the RFoG network during transmission of an uplink signal, that is, an radio frequency over glass optical network unit (R-ONU) transmitting circuit automatically controls, by automatically detecting a level of a radio frequency signal, a laser on an uplink channel to be enabled and disabled, and transmits, in an optical fiber, a radio frequency signal by means of amplitude modulation and/or frequency modulation. It must be ensured that a cable modem termination system (CMTS) can perform uplink communication with one or more CMs that are located after only one R-ONU. If two or more R-ONUs that have a same wavelength or similar wavelengths simultaneously perform uplink transmission in an optical fiber, optical beat interference occurs, causing a decrease in a signal-to-noise ratio of an uplink signal, packet loss and the like, which seriously affect uplink communication.

For DOCSIS 3.1, both orthogonal frequency division multiple access (OFDMA) and single channel quadrature amplitude modulation (SC-QAM) technologies are used in the uplink. A difference between the OFDMA technology and the SC-QAM technology lies in uplink TDM in the uplink of the SC-QAM, multiple CMs simultaneously send an uplink signal in one OFDMA frame, and if in one OFDMA frame, multiple CMs are located after multiple R-ONUs that have a same wavelength or similar wavelengths, a conflict inevitably exists in the uplink of an RFoG system.

SUMMARY

Embodiments of the present disclosure provide an uplink signal transmission method, a processing device, and a system, which can avoid a conflict that occurs when OFDMA and SC-QAM uplink signals in a coaxial distribution network are transmitted using an optical fiber radio frequency system.

To resolve the foregoing technical problem, a first aspect of the present disclosure provides an uplink signal scheduling method, which may include, when uplink signals sent by at least one transmit device are received, preprocessing the uplink signals, to generate a DOCSIS frame, where the DOCSIS frame includes at least two uplink signals, and each uplink signal of the at least two uplink signals corresponds to one uplink wavelength, when it is detected that a signal conflict exists in the DOCSIS frame, creating at least two signal groups according to the uplink signals, and allocating, to the at least two signal groups, uplink signals that have a same uplink wavelength and cause the signal conflict, and performing scheduling on the uplink signals according to the signal groups that have undergone allocation.

According to the first aspect, in a first feasible implementation manner of the first aspect, before the receiving uplink signals sent by at least one transmit device, the method further includes configuring an uplink wavelength for each transmit device of the at least one transmit device to send an uplink signal such that each transmit device of the at least one transmit device sends an uplink signal using the configured uplink wavelength.

According to the first aspect or the first feasible implementation manner of the first aspect, in a second feasible implementation manner of the first aspect, the preprocessing the uplink signals, to generate a DOCSIS frame includes separating the uplink signals according to at least one type of uplink wavelength, converting each separated uplink signal into a radio frequency signal, and combining all converted radio frequency signals into an electrical domain signal, and demodulating the electrical domain signal to obtain the DOCSIS frame.

According to the first aspect or the first feasible implementation manner of the first aspect or the second feasible implementation manner of the first aspect, in a third feasible implementation manner of the first aspect, the detecting that a signal conflict exists in the DOCSIS frame includes, when it is detected that exception information occurs on an uplink channel used for transmitting the uplink signals, determining that a signal conflict exists in the DOCSIS frame, where the exception information includes modulation error ratio degradation, or an increase in a packet loss rate or the like.

According to the first aspect or the first feasible implementation manner of the first aspect or the second feasible implementation manner of the first aspect or the third feasible implementation manner of the first aspect, in a fourth feasible implementation manner of the first aspect, the allocating, to the signal groups, uplink signals that have a same uplink wavelength and cause the signal conflict includes acquiring, according to the signal conflict, the uplink signals that have a same uplink wavelength, and allocating the uplink signals that have a same uplink wavelength to different signal groups, and acquiring the signal groups that have undergone allocation.

According to the first aspect or the first feasible implementation manner of the first aspect or the second feasible implementation manner of the first aspect or the third feasible implementation manner of the first aspect or the fourth feasible implementation manner of the first aspect, in a fifth feasible implementation manner of the first aspect, the performing scheduling on the uplink signals according to the signal groups that have undergone allocation includes scheduling an uplink bandwidth resource according to the signal groups that have undergone allocation, and allocating the scheduled uplink bandwidth resource to CMs corresponding to the uplink signals.

A second aspect of the present disclosure provides a processing device, which may include a processing module configured to, when uplink signals sent by at least one transmit device are received, preprocess the uplink signals, to generate a DOCSIS frame, where the DOCSIS frame includes at least two uplink signals, and each uplink signal of the at least two uplink signals corresponds to one uplink wavelength, a grouping module configured to, when it is detected that a signal conflict exists in the DOCSIS frame, create at least two signal groups according to the uplink signals, and allocate, to the at least two signal groups, uplink signals that have a same uplink wavelength and cause the signal conflict, and a scheduling module configured to perform scheduling on the uplink signals according to the signal groups that have undergone allocation.

According to the second aspect, in a first feasible implementation manner of the second aspect, the method further includes a configuration module configured to configure an uplink wavelength for each transmit device of the at least one transmit device to send an uplink signal such that each transmit device of the at least one transmit device sends an uplink signal using the configured uplink wavelength.

According to the second aspect or the first feasible implementation manner of the second aspect, in a second feasible implementation manner of the second aspect, the processing module includes a separation unit configured to, when the uplink signals sent by the at least one transmit device are received, separate the uplink signals according to at least one type of uplink wavelength, a combination unit configured to convert each separated uplink signal into a radio frequency signal, and combine all converted radio frequency signals into an electrical domain signal, and a demodulation unit configured to demodulate the electrical domain signal to obtain the DOCSIS frame.

According to the second aspect or the first feasible implementation manner of the second aspect or the second feasible implementation manner of the second aspect, in a third feasible implementation manner of the second aspect, the grouping module includes, a determining unit configured to, when it is detected that exception information occurs on an uplink channel used for transmitting the uplink signals, determine that a signal conflict exists in the DOCSIS frame, where the exception information includes modulation error ratio degradation, or an increase in a packet loss rate or the like, a grouping unit configured to create at least two signal groups according to the uplink signals, a signal acquiring unit configured to acquire, according to the signal conflict, the uplink signals that have a same uplink wavelength, and an allocation and acquiring unit configured to allocate the uplink signals that have a same uplink wavelength to different signal groups, and acquire the signal groups that have undergone allocation.

According to the second aspect or the first feasible implementation manner of the second aspect or the second feasible implementation manner of the second aspect or the third feasible implementation manner of the second aspect, in a fourth feasible implementation manner of the second aspect, the scheduling module is further configured to schedule an uplink bandwidth resource according to the signal groups that have undergone allocation, and allocate the scheduled uplink bandwidth resource to CMs corresponding to the uplink signals.

A third aspect of the present disclosure provides a processing device, which may include a receiver and a processor, where the processor performs the following steps: when controlling the receiver to receive uplink signals sent by at least one transmit device, preprocessing the uplink signals, to generate a DOCSIS frame, where the DOCSIS frame includes at least two uplink signals, and each uplink signal of the at least two uplink signals corresponds to one uplink wavelength; when detecting that a signal conflict exists in the DOCSIS frame, creating at least two signal groups according to the uplink signals, and allocating, to the at least two signal groups, uplink signals that have a same uplink wavelength and cause the signal conflict, and performing scheduling on the uplink signals according to the signal groups that have undergone allocation.

A fourth aspect of the present disclosure provides an uplink signal scheduling system, which may include at least one transmit device and the processing device according to the second aspect, or may include at least one transmit device and the processing device according to the third aspect, where the transmit device is configured to send uplink signals to the processing device such that the processing device preprocesses the uplink signals, to generate a DOCSIS frame such that when detecting that a signal conflict exists in the DOCSIS frame, the processing device creates at least two signal groups according to the uplink signals, and allocates, to the at least two signal groups, uplink signals that have a same uplink wavelength and cause the signal conflict, and the processing device performs scheduling on the uplink signals according to the signal groups that have undergone allocation, where the transmit device is an R-ONU that uses a wavelength tunable laser or an R-ONU that uses a colored laser.

As can be learned from the above, uplink signals sent by at least one transmit device are received, and scheduling is performed on the uplink signals according to signal groups such that multiple uplink signals are allowed to be received simultaneously at any time, and a transmit device uses a wavelength tunable laser or uses a colored laser, which increases tunability of an uplink wavelength of an uplink signal sent by the transmit device, and avoids a conflict between uplink signals to the greatest extent, thereby better ensuring normal communication on an uplink channel.

BRIEF DESCRIPTION OF DRAWINGS

To describe the technical solutions in the embodiments of the present disclosure or in the prior art more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

In the embodiments of the present disclosure, a DOCSIS system may include a CMTS, an HFC network, a CM, and the like. The CMTS may be deployed at a front end of a cable television network, or may be deployed in an optical station in a bidirectional HFC network, and functions as a gateway between a data network and the HFC network. The CM is deployed between the HFC network and user equipment. In the uplink of the DOCSIS system, advanced time division multiple access (A-TDMA) and synchronous code division multiple access (S-CDMA) are supported, and OFDMA and SC-QAM can be used to improve spectral efficiency. Therefore, DOCSIS systems are widely used. Currently, a manner of time division multiple access (TDMA) is generally used in the uplink, and TDM is implemented by dividing, on different channels, different mini-slots for different user equipment.

When a processing device receives uplink signals sent by at least one transmit device, the processing device monitors the uplink signals, and if detecting that a signal conflict exists between the uplink signals, the processing device performs signal grouping on the uplink signals, and performs scheduling on the uplink signals according to the signal groups.

It should be noted that the processing device may be a CMTS, the uplink signal is transmitted by a CM to a transmit device corresponding to the CM, and transmitted by the transmit device to the processing device using an optical node. An uplink signal uploaded by the CM is processed by the processing device, and uplink communication between the CM and the processing device is completed. The transmit device may be an R-ONU that uses a wavelength tunable laser or an R-ONU that uses a colored laser.

Figure 1:
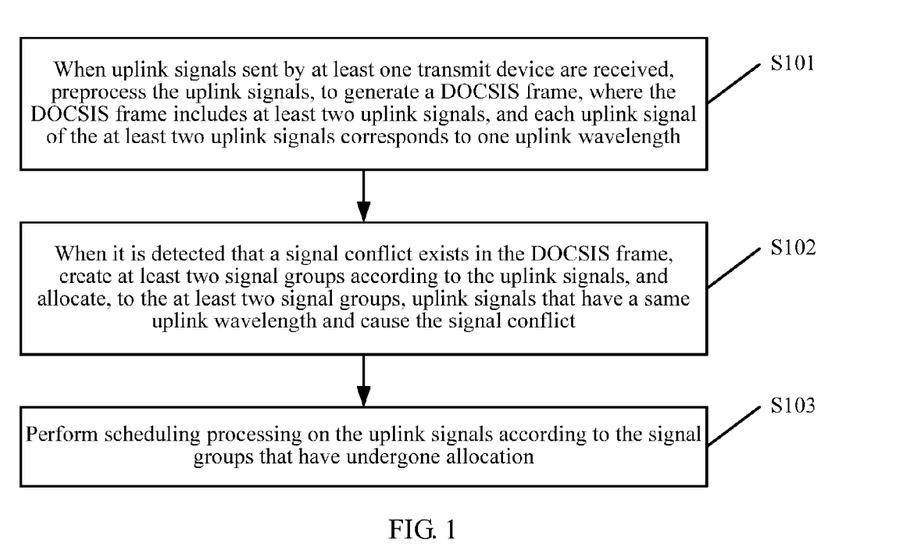
FIG. 1 is a schematic flowchart of an uplink signal scheduling method according to an embodiment of the present disclosure.
Figure 2:
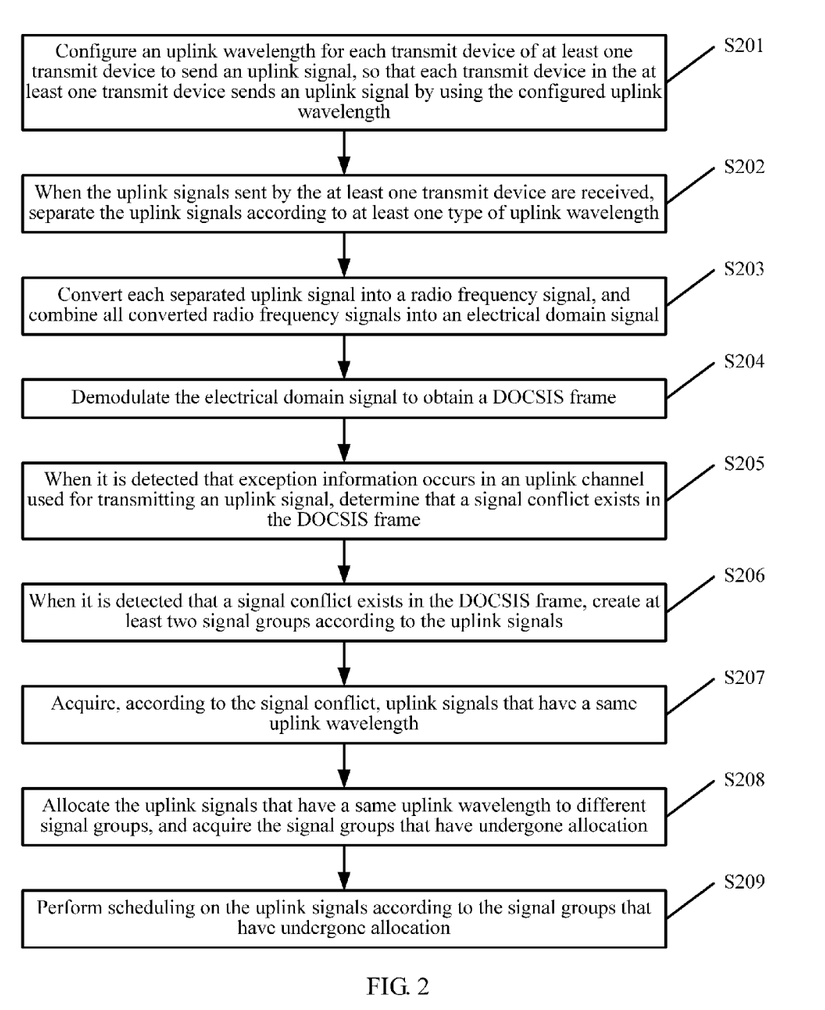
FIG. 2 is a schematic flowchart of another uplink signal scheduling method according to an embodiment of the present disclosure.

With reference to FIG. 1 and FIG. 2, the following describes in detail an uplink signal scheduling method provided in the embodiments of the present disclosure.

Refer to FIG. 1, which is a schematic flowchart of an uplink signal scheduling method according to an embodiment of the present disclosure. As shown in FIG. 1, the method of this embodiment of the present disclosure includes step S101 to step S103 in the following.

Step S101: When uplink signals sent by at least one transmit device are received, preprocess the uplink signals, to generate a DOCSIS frame, where the DOCSIS frame includes at least two uplink signals, and each uplink signal of the at least two uplink signals corresponds to one uplink wavelength.

When a processing device receives uplink signals sent by at least one transmit device, the processing device may preprocess the uplink signals. A procedure for the preprocessing may include, separating the uplink signals according to at least one type of uplink wavelength, converting each separated uplink signal into a radio frequency signal, and combining all converted radio frequency signals into an electrical domain signal, performing processing, such as amplification, filtering, or analog-to-digital conversion on the electrical domain signal, and demodulating the processed electrical domain signal separately according to SC-QAM and OFDMA, to generate a DOCSIS frame, where the DOCSIS frame includes at least two uplink signals, each uplink signal of the at least two uplink signals corresponds to one uplink wavelength. It should be noted that uplink wavelengths corresponding to the uplink signals may be a same uplink wavelength, or may be different uplink wavelengths. For a specific uplink wavelength, an uplink wavelength of an uplink signal sent by the transmit device may be preconfigured by the processing device.

After generating the DOCSIS frame, the processing device may monitor an uplink channel used for transmitting the uplink signals, and if the processing device detects that exception information occurs on the uplink channel, the processing device determines that a signal conflict exists between the uplink signals.

The exception information includes modulation error ratio degradation, an increase in a packet loss rate or the like, or signal-to-noise ratio degradation of an uplink channel, or the like, and the signal conflict is a case in which uplink wavelengths of uplink signals sent by a transmit device of the at least one transmit device are the same.

It should be noted that the transmit device may be an R-ONU that uses a wavelength tunable laser or an R-ONU that uses a colored laser. The transmit device may work in a burst mode, or may work in a continuous mode. A burst mode indicates that multiple R-ONUs may share one uplink wavelength, and a continuous mode indicates that one R-ONU can occupy only one specific uplink wavelength. In the burst mode, although a length of a cyclic prefix (CP) of an OFDM uplink signal and a length of a preamble of an SC-QAM uplink signal are limited, compared with the continuous mode, using the burst mode can effectively reduce a signal-to-noise ratio of an uplink channel.

The wavelength tunable laser may include a distributed feedback (DFB) laser or a distributed Bragg reflector (DBR) laser. The colored laser may include a coarse wavelength division multiplexer (CWDM) laser, or a dense wavelength division multiplexer (DWDM) laser. Costs of using a CWDM laser are lower than costs of using a DWDM laser, a DFB laser, or a DBR laser, where the DFB laser and the DBR laser are both wavelength tunable lasers. A wavelength tunable range (where each degree Celsius corresponds to a wavelength shift of 0.1 nm) of 3 nm to 4 nm can be achieved by controlling an operating temperature of the DFB laser. The DBR laser has a wavelength tunable range of about 10 nm.

Step S102: When it is detected that a signal conflict exists in the DOCSIS frame, create at least two signal groups according to the uplink signals, and allocate, to the at least two signal groups, uplink signals that have a same uplink wavelength and cause the signal conflict.

When the processing device detects that a signal conflict exists in the DOCSIS frame, the creating, by the processing device, signal groups according to the uplink signals further includes searching for CM identifiers of the at least one transmit device that sends the uplink signals, and creating the at least two signal groups according to the found CM identifiers, allocating, by the processing device to different signal groups, CM identifiers indicated by uplink signals that have a same uplink wavelength and cause the signal conflict, and acquiring the signal groups that have undergone allocation.

It should be noted that the signal group is preferably a grouping matrix, the processing device records CM identifiers of all transmit devices, and the signal groups may be set according to the CM identifiers.

Optionally, when the processing device detects that a signal conflict exists in the DOCSIS frame, the processing device may adjust the uplink wavelengths of the uplink signals sent by the at least one transmit device, which can ensure that when the signal conflict occurs, the uplink wavelengths of the uplink signals sent by the at least one transmit device are properly allocated.

Step S103: Perform scheduling processing on the uplink signals according to the signal groups that have undergone allocation.

The processing device schedules an uplink bandwidth resource according to the signal groups that have undergone allocation, and allocates the scheduled uplink bandwidth resource to CMs that correspond to the uplink signals. The uplink bandwidth resource may include a time domain resource, a frequency domain resource, or the like.

Further, after performing scheduling on the uplink signals, the processing device processes the uplink signals according to the signal groups in order to complete communication with the CMs in an uplink channel.

In this embodiment of the present disclosure, uplink signals sent by at least one transmit device are received, and scheduling is performed on the uplink signals according to signal groups such that multiple uplink signals are allowed to be received simultaneously at any time, and a transmit device uses a wavelength tunable laser or uses a colored laser, which increases tunability of an uplink wavelength of an uplink signal sent by the transmit device, and avoids a conflict between uplink signals to the greatest extent, thereby better ensuring normal communication on an uplink channel.

Refer to FIG. 2, which is a schematic flowchart of another uplink signal scheduling method according to an embodiment of the present disclosure. As shown in FIG. 2, the method of this embodiment of the present disclosure includes step S201 to step S210 in the following.

Step S201: Configure an uplink wavelength for each transmit device of at least one transmit device to send an uplink signal such that each transmit device of the at least one transmit device sends an uplink signal using the configured uplink wavelength.

The processing device configures the uplink wavelength for each transmit device of the at least one transmit device to send an uplink signal. Preferably, the processing device may send configuration information to at least one transmit device, where the configuration information may carry information about the uplink wavelength for each transmit device of the at least one transmit device to send an uplink signal.

For example, for a transmit device that includes a wavelength tunable laser, when the transmit device is powered on, the transmit device works on a preset wavelength, and a parsing module needs to be built in the transmit device and is configured to parse configuration information delivered by the processing device. The processing device may deliver configuration information using a downlink channel according to an uplink conflict monitoring status. For example, if a DOCSIS includes only four transmit devices, the processing device may tune an uplink wavelength of the transmit device to a specific value using the configuration information, which can ensure that no conflicting uplink signals exist on an uplink channel of the system. If a DOCSIS system includes more than four transmit devices, the processing device needs to tune an uplink wavelength using a preset algorithm and according to an uplink channel status, and configure the uplink wavelength of the transmit device using the configuration information, thereby ensuring that no conflicting uplink signals exist on an uplink channel of the system.

Step S202: When the uplink signals sent by the at least one transmit device are received, separate the uplink signals according to at least one type of uplink wavelength.

When the processing device receives at least one uplink signal sent by a transmit device, the processing device separates the uplink signal according to at least one type of uplink wavelength, to form multiple uplink signals.

Step S203: Convert each separated uplink signal into a radio frequency signal, and combine all converted radio frequency signals into an electrical domain signal.

The processing device converts each separated uplink signal into a radio frequency signal, and combines all converted radio frequency signals into one electrical domain signal.

Step S204: Demodulate the electrical domain signal to obtain a DOCSIS frame.

The processing device performs processing, such as amplification, filtering, or analog-to-digital conversion on the electrical domain signal, and demodulates the processed electrical domain signal separately according to SC-QAM and OFDMA, to generate the DOCSIS frame.

It should be noted that a procedure for demodulation according to OFDMA includes performing processing, such as fast Fourier transform (FFT), de-interleaving, or error correction encoding and decoding on the electrical domain signal.

Step S205: When it is detected that exception information occurs on an uplink channel used for transmitting the uplink signals, determine that a signal conflict exists in the DOCSIS frame.

After the processing device finishes preprocessing the uplink signals, and generates the DOCSIS frame, the processing device may monitor an uplink channel used for transmitting the uplink signals.

If the processing device detects that exception information occurs on the uplink channel, the processing device determines that a signal conflict exists in the DOCSIS frame.

The exception information includes modulation error ratio degradation, an increase in a packet loss rate or the like, or signal-to-noise ratio degradation of an uplink channel, or the like, and the signal conflict is a case in which uplink wavelengths of uplink signals sent by a transmit device of the at least one transmit device are the same.

Step S206: When it is detected that a signal conflict exists in the DOCSIS frame, create at least two signal groups according to the uplink signals.

When the processing device detects that a signal conflict exists in the DOCSIS frame, the processing device searches for CM identifiers of the at least one transmit device that sends the uplink signals, and creates the at least two signal groups according to the found CM identifiers.

It should be noted that the signal group is preferably a grouping matrix, the processing device records CM identifiers of all transmit devices, and the signal groups may be set according to the CM identifiers.

Optionally, when the processing device detects that a signal conflict exists in the DOCSIS frame, the processing device may adjust, according to a quantity of CMs of each transmit device of the at least one transmit device, an uplink wavelength of an uplink signal sent by each transmit device of the at least one transmit device.

Furthermore, when the processing device detects that a signal conflict exists in the DOCSIS frame, the processing device may adjust uplink wavelengths of the uplink signals sent by the at least one transmit device, which can ensure that when the signal conflict occurs, the uplink wavelengths of the uplink signals sent by the at least one transmit device are properly allocated. For example, there are three transmit devices an R-ONU 1, an R-ONU 2, and an R-ONU 3. If the R-ONU 1 is connected to one CM, the R-ONU2 is connected to 10 CMs, and the R-ONU 3 is connected to 30 CMs, and it is assumed that when step S201 and step S202 are performed, the processing device allocates a first uplink wavelength to the R-ONU 2 and the R-ONU 3, and allocates a second uplink wavelength to the R-ONU 1, when the processing device detects that a signal conflict exists between the uplink signals, the processing device may adjust again, according to a quantity of CMs of each transmit device of the at least one transmit device, the uplink wavelengths of the at least one transmit device. Because a quantity of CMs of the R-ONU 3 is relatively large, the first wavelength can be allocated to the R-ONU 3 only, and the second wavelength is allocated to the R-ONU 1 and the R-ONU 2, thereby reducing a probability of occurrence of a conflict between uplink signals.

Step S207: Acquire, according to the signal conflict, uplink signals that have a same uplink wavelength.

The processing device can acquire, according to the signal conflict, the uplink signals that have a same uplink wavelength and cause the signal conflict. Preferably, the processing device acquires CM identifiers indicated by the uplink signals that have a same uplink wavelength.

Step S208: Allocate the uplink signals that have a same uplink wavelength to different signal groups, and acquire the signal groups that have undergone allocation.

The processing device allocates, according to the signal conflict, the CM identifiers indicated by the uplink signals that have a same uplink wavelength to different signal groups, and acquires the signal groups that have undergone allocation.

Step S209: Perform scheduling on the uplink signals according to the signal groups that have undergone allocation.

The processing device schedules an uplink bandwidth resource according to the signal groups that have undergone allocation, and allocates the scheduled uplink bandwidth resource to CMs corresponding to the uplink signals. The uplink bandwidth resource may include a time domain resource, a frequency domain resource, or the like.

Further, after performing scheduling on the uplink signals, the processing device processes the uplink signals according to the signal groups in order to complete communication with the CMs in an uplink channel.

In this embodiment of the present disclosure, uplink signals sent by at least one transmit device are received, and scheduling is performed on the uplink signals according to signal groups such that multiple uplink signals are allowed to be received simultaneously at any time, and the transmit device uses a wavelength tunable laser or uses a colored laser, which increases tunability of an uplink wavelength of an uplink signal sent by the transmit device, and increases wavelength types of uplink wavelengths. Therefore, in a case in which a burst mode is used, hybrid multiplexing of wavelength division multiplexing (WDM) and TDM can be implemented, and when it is detected that a signal conflict exists, uplink wavelengths of the transmit device can be adjusted again, which ensures that the uplink wavelengths of the transmit device are properly allocated, and avoids a conflict between uplink signals to the greatest extent, thereby better ensuring normal communication on an uplink channel.

The following describes the processing device provided in this embodiment of the present disclosure in detail with reference to FIG. 3 to FIG. 7. It should be noted that the processing devices shown in FIG. 3 to FIG. 7 are used to perform the methods of the embodiments shown in FIG. 1 and FIG. 2. For ease of description, only parts related to this embodiment are described. For technical details that are not disclosed, refer to the embodiments shown in FIG. 1 and FIG. 2 of the present disclosure.

Figure 3:
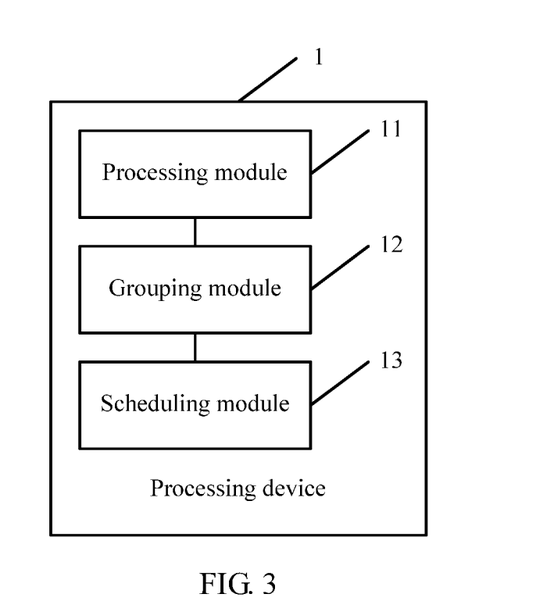
FIG. 3 is a schematic structural diagram of a processing device according to an embodiment of the present disclosure.

Refer to FIG. 3, which is a schematic structural diagram of a processing device 1 according to an embodiment of the present disclosure. As shown in FIG. 3, the processing device 1 in this embodiment of the present disclosure may include a processing module 11, a grouping module 12, and a scheduling module 13.

The processing module 11 is configured to, when uplink signals sent by at least one transmit device are received, preprocess the uplink signals, to generate a DOCSIS frame, where the DOCSIS frame includes at least two uplink signals, and each uplink signal of the at least two uplink signals corresponds to one uplink wavelength.

In a specific implementation, when a processing device 1 receives uplink signals sent by at least one transmit device, the processing module 11 may preprocess the uplink signals. A procedure for the preprocessing may include separating the uplink signals according to at least one type of uplink wavelength, converting each separated uplink signal into a radio frequency signal, and combining all converted radio frequency signals into an electrical domain signal, performing processing, such as amplification, filtering, or analog-to-digital conversion on the electrical domain signal, and demodulating the processed electrical domain signal separately according to SC-QAM and OFDMA, to generate a DOCSIS frame, where the DOCSIS frame includes at least two uplink signals, each uplink signal of the at least two uplink signals corresponds to one uplink wavelength. It should be noted that uplink wavelengths corresponding to the uplink signals may be a same uplink wavelength, or may be different uplink wavelengths. For a specific uplink wavelength, an uplink wavelength of an uplink signal sent by the transmit device may be preconfigured by the processing device 1.

After the processing module 11 generates the DOCSIS frame, the processing device 1 may monitor an uplink channel used for transmitting the uplink signals, and if the processing device 1 detects that exception information occurs on the uplink channel, the processing device 1 determines that a signal conflict exists in the DOCSIS frame.

The exception information includes modulation error ratio degradation, an increase in a packet loss rate or the like, or signal-to-noise ratio degradation of an uplink channel, or the like. The signal conflict is a case in which uplink wavelengths of uplink signals sent by a transmit device of the at least one transmit device are the same.

It should be noted that the transmit device may be an R-ONU that uses a wavelength tunable laser or an R-ONU that uses a colored laser. The transmit device may work in a burst mode, or may work in a continuous mode. A burst mode indicates that multiple R-ONUs may share one uplink wavelength, and a continuous mode indicates that one R-ONU can occupy only one specific uplink wavelength. In the burst mode, although a length of a CP of an OFDM uplink signal and a length of a preamble of an SC-QAM uplink signal are limited, compared with the continuous mode, using the burst mode can effectively reduce a signal-to-noise ratio of an uplink channel.

The wavelength tunable laser may include a DFB laser or a DBR laser. The colored laser may include a CWDM laser, or a DWDM laser. Costs of using a CWDM laser are lower than costs of using a DWDM laser, a DFB laser, or a DBR laser, where the DFB laser and the DBR laser are both wavelength tunable lasers. A wavelength tunable range (where each degree Celsius corresponds to a wavelength shift of 0.1 nm) of 3 nm to 4 nm can be achieved by controlling an operating temperature of the DFB laser. The DBR has a wavelength tunable range of about 10 nm.

The grouping module 12 is configured to, when it is detected that a signal conflict exists in the DOCSIS frame, create at least two signal groups according to the uplink signals, and allocate, to the at least two signal groups, uplink signals that have a same uplink wavelength and cause the signal conflict.

In a specific implementation, when the processing device 1 detects that a signal conflict exists in the DOCSIS frame, the creating, by the grouping module 12, signal groups according to the uplink signals further includes searching for CM identifiers of the at least one transmit device that sends the uplink signals, and creating the at least two signal groups according to the found CM identifiers, allocating, by the processing device to different signal groups, CM identifiers indicated by uplink signals that have a same uplink wavelength and cause the signal conflict, and acquiring the signal groups that have undergone allocation.

It should be noted that the signal group is preferably a grouping matrix, the processing device 1 records CM identifiers of all transmit devices, and the signal groups may be set according to the CM identifiers.

Optionally, when the processing device 1 detects that a signal conflict exists between the uplink signals, the processing device 1 may adjust the uplink wavelengths of the uplink signals sent by the at least one transmit device, which can ensure that when the signal conflict occurs, the uplink wavelengths of the uplink signals sent by the at least one transmit device are properly allocated.

The scheduling module 13 is configured to perform scheduling on the uplink signals according to the signal groups that have undergone allocation.

Further, the scheduling module 13 schedules an uplink bandwidth resource according to the signal groups that have undergone allocation, and allocates the scheduled uplink bandwidth resource to CMs corresponding to the uplink signals. The uplink bandwidth resource may include a time domain resource, a frequency domain resource, or the like.

Further, after the scheduling module 13 performs the scheduling on the uplink signals, the processing device 1 processes the uplink signals according to the signal groups in order to complete communication with the CMs in an uplink channel.

In this embodiment of the present disclosure, uplink signals sent by at least one transmit device are received, and scheduling is performed on the uplink signals according to signal groups such that multiple uplink signals are allowed to be received simultaneously at any time, and a transmit device uses a wavelength tunable laser or uses a colored laser, which increases tunability of an uplink wavelength of an uplink signal sent by the transmit device, and avoids a conflict between uplink signals to the greatest extent, thereby better ensuring normal communication on an uplink channel.

Figure 4:
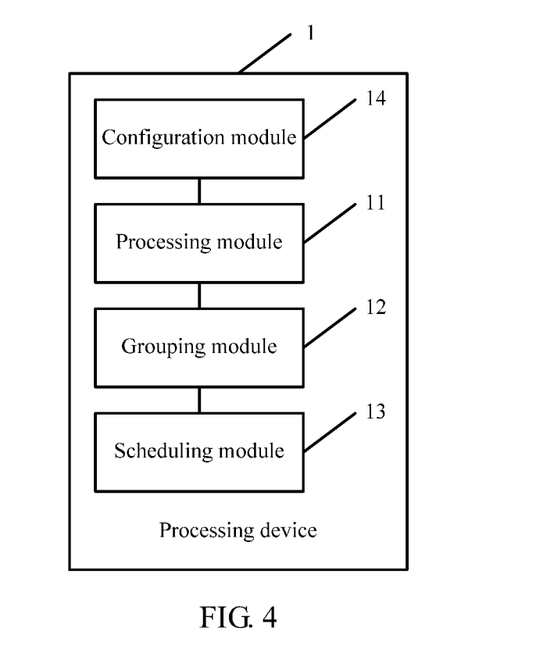
FIG. 4 is a schematic structural diagram of another processing device according to an embodiment of the present disclosure.

Refer to FIG. 4, which is a schematic structural diagram of another processing device 1 according to an embodiment of the present disclosure. As shown in FIG. 4, the processing device 1 in this embodiment of the present disclosure may include a processing module 11, a grouping module 12, a scheduling module 13, and a configuration module 14.

The configuration module 14 is configured to configure an uplink wavelength for each transmit device of at least one transmit device to send an uplink signal such that each transmit device of the at least one transmit device sends an uplink signal using the configured uplink wavelength.

In a specific implementation, the configuration module 14 configures an uplink wavelength for each transmit device of at least one transmit device to send an uplink signal. Preferably, the configuration module 14 may send configuration information to at least one transmit device that sends an uplink signal, where the configuration information may carry information about the uplink wavelength for each transmit device of the at least one transmit device to send an uplink signal.

The transmit device may be an R-ONU that uses a wavelength tunable laser or an R-ONU that uses a colored laser. The transmit device may work in a burst mode, or may work in a continuous mode. A burst mode indicates that multiple R-ONUs may share one uplink wavelength, and a continuous mode indicates that one R-ONU can occupy only one specific uplink wavelength. In the burst mode, although a length of a CP of an OFDM uplink signal and a length of a preamble of an SC-QAM uplink signal are limited, compared with the continuous mode, using the burst mode can effectively reduce a signal-to-noise ratio of an uplink channel.

The wavelength tunable laser may include a DFB laser or a DBR laser. The colored laser may include a CWDM laser, or a DWDM laser. Costs of using a CWDM laser are lower than costs of using a DWDM laser, a DFB laser, or a DBR laser, where the DFB laser and the DBR laser are both wavelength tunable lasers. A wavelength tunable range (where each degree Celsius corresponds to a wavelength shift of 0.1 nm) of 3 nm to 4 nm can be achieved by controlling an operating temperature of the DFB laser. The DBR has a wavelength tunable range of about 10 nm.

For example, for a transmit device that includes a wavelength tunable laser, when the transmit device is powered on, the transmit device works on a preset wavelength, and a parsing module needs to be built in the transmit device and is configured to parse configuration information delivered by the processing device. The processing device may deliver configuration information using a downlink channel according to an uplink conflict monitoring status. For example, if a DOCSIS system includes only four transmit devices, the configuration module 14 may tune an uplink wavelength of the transmit device to a specific value using the configuration information, which can ensure that no conflicting uplink signals exist on an uplink channel of the system. If a DOCSIS system includes more than four transmit devices, the configuration module 14 needs to tune an uplink wavelength using a preset algorithm and according to an uplink channel status, and configure the uplink wavelength of the transmit device using the configuration information, thereby ensuring that no conflicting uplink signals exist on an uplink channel of the system.

The processing module 11 is configured to, when uplink signals sent by at least one transmit device are received, preprocess the uplink signals, to generate a DOCSIS frame, where the DOCSIS frame includes at least two uplink signals, and each uplink signal of the at least two uplink signals corresponds to one uplink wavelength.

In a specific implementation, when the processing device 1 receives uplink signals sent by at least one transmit device, the processing module 11 may preprocess the uplink signals. A procedure for the preprocessing may include separating the uplink signals according to at least one type of uplink wavelength, converting each separated uplink signal into a radio frequency signal, and combining all converted radio frequency signals into an electrical domain signal, performing processing, such as amplification, filtering, or analog-to-digital conversion on the electrical domain signal, and demodulating the processed electrical domain signal separately according to SC-QAM and OFDMA, to generate a DOCSIS frame, where the DOCSIS frame includes at least two uplink signals, each uplink signal of the at least two uplink signals corresponds to one uplink wavelength. It should be noted that uplink wavelengths corresponding to the uplink signals may be a same uplink wavelength, or may be different uplink wavelengths. For a specific uplink wavelength, an uplink wavelength of an uplink signal sent by the transmit device may be preconfigured by the configuration module 14.

Figure 5:
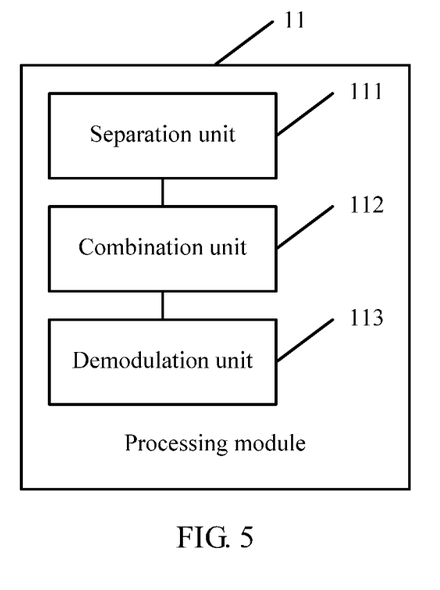
FIG. 5 is a schematic structural diagram of a processing module according to an embodiment of the present disclosure.

Refer to FIG. 5, which is a schematic structural diagram of the processing module according to this embodiment of the present disclosure. As shown in FIG. 5, the processing module 11 may include a separation unit 111, a combination unit 112, and a demodulation unit 113.

The separation unit 111 is configured to, when the uplink signals sent by the at least one transmit device are received, separate the uplink signals according to at least one type of uplink wavelength.

In a specific implementation, when the processing device receives at least one uplink signal sent by a transmit device, the separation unit 111 separates the uplink signal according to at least one type of uplink wavelength, to form multiple uplink signals.

The combination unit 112 is configured to convert each separated uplink signal into a radio frequency signal, and combine all converted radio frequency signals into an electrical domain signal.

In a specific implementation, the combination unit 112 converts each separated uplink signal into a radio frequency signal, and combines all converted radio frequency signals into one electrical domain signal.

The demodulation unit 113 is configured to demodulate the electrical domain signal to obtain the DOCSIS frame.

In a specific implementation, the demodulation unit 113 performs processing, such as amplification, filtering, or analog-to-digital conversion on the electrical domain signal, and demodulates the processed electrical domain signal separately according to SC-QAM and OFDMA, to generate the DOCSIS frame.

It should be noted that a procedure for demodulation according to OFDMA includes performing processing, such as FFT, de-interleaving, or error correction encoding and decoding on the electrical domain signal.

The grouping module 12 is configured to, when it is detected that a signal conflict exists in the DOCSIS frame, create at least two signal groups according to the uplink signals, and allocate, to the at least two signal groups, uplink signals that have a same uplink wavelength and cause the signal conflict.

In a specific implementation, when the processing device 1 detects that a signal conflict exists in the DOCSIS frame, the creating, by the processing device, signal groups according to the uplink signals further includes searching for CM identifiers of the at least one transmit device that sends the uplink signals, and creating the at least two signal groups according to the found CM identifiers, allocating, by the grouping module 12 to different signal groups, CM identifiers indicated by uplink signals that have a same uplink wavelength and cause the signal conflict, and acquiring the signal groups that have undergone allocation.

It should be noted that the signal group is preferably a grouping matrix, the processing device records CM identifiers of all transmit devices, and the signal groups may be set according to the CM identifiers.

Optionally, when the processing device detects that a signal conflict exists in the DOCSIS frame, the processing device may adjust the uplink wavelengths of the uplink signals sent by the at least one transmit device, which can ensure that when the signal conflict occurs, the uplink wavelengths of the uplink signals sent by the at least one transmit device are properly allocated.

Figure 6:
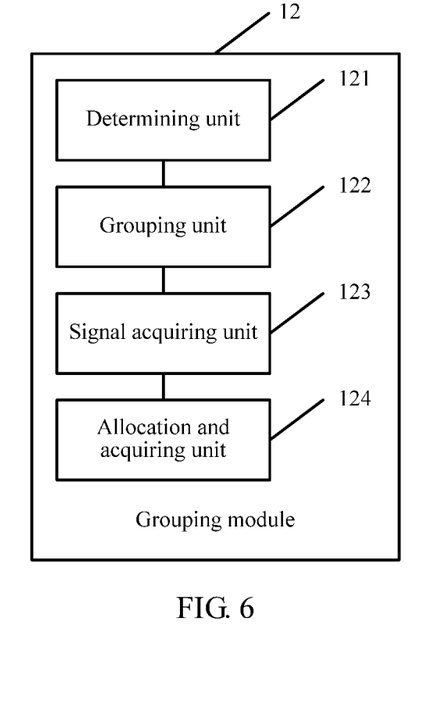
FIG. 6 is a schematic structural diagram of a grouping module according to an embodiment of the present disclosure.

Refer to FIG. 6, which is a schematic structural diagram of the grouping module according to this embodiment of the present disclosure. As shown in FIG. 6, the grouping module 12 may include a determining unit 121, a grouping unit 122, a signal acquiring unit 123, and an allocation and acquiring unit 124.

The determining unit 121 is configured to, when it is detected that exception information occurs on an uplink channel used for transmitting the uplink signals, determine that a signal conflict exists in the DOCSIS frame, where the exception information includes modulation error ratio degradation, or an increase in a packet loss rate or the like.

In a specific implementation, after the processing module 11 finishes preprocessing the uplink signals, and generates the DOCSIS frame, the processing device 1 may monitor an uplink channel used for transmitting the uplink signals.

If the processing device detects that exception information occurs on the uplink channel, the determining unit 121 determines that a signal conflict exists in the DOCSIS frame.

The exception information includes modulation error ratio degradation, an increase in a packet loss rate or the like, or signal-to-noise ratio degradation of an uplink channel, or the like. The signal conflict is a case in which uplink wavelengths of uplink signals sent by a transmit device of the at least one transmit device are the same.

The grouping unit 122 is configured to create at least two signal groups according to the uplink signals.

In a specific implementation, when the determining unit 121 determines that a signal conflict exists in the DOCSIS frame, the grouping unit 122 searches for CM identifiers of the at least one transmit device that sends the uplink signals, and creates the at least two signal groups according to the found CM identifiers.

It should be noted that the signal group is preferably a grouping matrix, the processing device 1 records CM identifiers of all transmit devices, and the signal groups may be set according to the CM identifiers.

Optionally, when the determining unit 121 determines that a signal conflict exists in the DOCSIS frame, the processing device may adjust, according to a quantity of CMs of each transmit device of the at least one transmit device, an uplink wavelength of an uplink signal sent by each transmit device of the at least one transmit device.

Furthermore, when the determining unit 121 determines that a signal conflict exists in the DOCSIS frame, the processing device 1 may adjust the uplink wavelengths of the uplink signals sent by the at least one transmit device, which can ensure that when a signal conflict occurs, the uplink wavelengths of the uplink signals sent by the at least one transmit device are properly allocated. For example, there are three transmit devices an R-ONU 1, an R-ONU 2, and an R-ONU 3. If the R-ONU 1 is connected to one CM, the R-ONU2 is connected to 10 CMs, and the R-ONU 3 is connected to 30 CMs, and it is assumed that when step S201 and step S202 are performed, the processing device 1 allocates a first uplink wavelength to the R-ONU 2 and the R-ONU 3, and allocates a second uplink wavelength to the R-ONU 1, when the processing device detects that a signal conflict exists between the uplink signals, the processing device 1 may adjust again, according to a quantity of CMs of each transmit device of the at least one transmit device, the uplink wavelengths of the at least one transmit device. Because a quantity of CMs of the R-ONU 3 is relatively large, the first wavelength can be allocated to the R-ONU 3 only, and the second wavelength is allocated to the R-ONU 1 and the R-ONU 2, thereby reducing a probability of occurrence of a conflict between uplink signals.

The signal acquiring unit 123 is configured to acquire, according to the signal conflict, the uplink signals that have a same uplink wavelength.

In a specific implementation, the signal acquiring unit 123 may acquire, according to the signal conflict, the uplink signals that have a same uplink wavelength and cause the signal conflict. Preferably, the signal acquiring unit 123 acquires CM identifiers indicated by the uplink signals that have a same uplink wavelength.

The allocation and acquiring unit 124 is configured to allocate the uplink signals that have a same uplink wavelength to different signal groups, and acquire the signal groups that have undergone allocation.

In a specific implementation, the allocation and acquiring unit 124 allocates, according to the signal conflict, the CM identifiers indicated by the uplink signals that have a same uplink wavelength to different signal groups, and acquires the signal groups that have undergone allocation.

A scheduling module 13 is configured to perform scheduling on the uplink signals according to the signal groups that have undergone allocation.

In a specific implementation, the scheduling module 13 schedules an uplink bandwidth resource according to the signal groups that have undergone allocation, and allocates the scheduled uplink bandwidth resource to CMs corresponding to the uplink signals. The uplink bandwidth resource may include a time domain resource, a frequency domain resource, or the like.

Further, after the scheduling module 13 performs the scheduling on the uplink signals, the processing device 1 processes the uplink signals according to the signal groups in order to complete communication with the CMs in an uplink channel.

In this embodiment of the present disclosure, uplink signals sent by at least one transmit device are received, and scheduling is performed on the uplink signals according to signal groups such that multiple uplink signals are allowed to be received simultaneously at any time, and the transmit device uses a wavelength tunable laser or uses a colored laser, which increases tunability of an uplink wavelength of an uplink signal sent by the transmit device, and increases wavelength types of uplink wavelengths. Therefore, in a case in which a burst mode is used, hybrid multiplexing of WDM and TDM can be implemented, and when it is detected that a signal conflict exists, uplink wavelengths of the transmit device can be adjusted again, which ensures that the uplink wavelengths of the transmit device are properly allocated, and avoids a conflict between uplink signals to the greatest extent, thereby better ensuring normal communication on an uplink channel.

Figure 7:
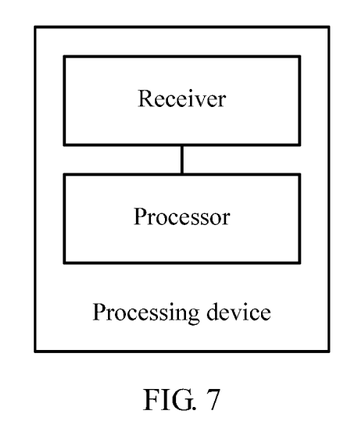
FIG. 7 is a schematic structural diagram of still another processing device according to an embodiment of the present disclosure.

Also refer to FIG. 7, which is a schematic structural diagram of still another processing device according to an embodiment of the present disclosure. As shown in FIG. 7, the processing device in this embodiment of the present disclosure may include a receiver and a processor, where the processor performs the following steps: when controlling the receiver to receive uplink signals sent by at least one transmit device, preprocessing the uplink signals, to generate a DOCSIS frame, where the DOCSIS frame includes at least two uplink signals, and each uplink signal of the at least two uplink signals corresponds to one uplink wavelength; when detecting that a signal conflict exists in the DOCSIS frame, creating at least two signal groups according to the uplink signals, and allocating, to the at least two signal groups, uplink signals that have a same uplink wavelength and cause the signal conflict, and performing scheduling on the uplink signals according to the signal groups that have undergone allocation.

Before performing the step of receiving uplink signals sent by at least one transmit device, the processor further performs the following step of configuring an uplink wavelength for each transmit device of the at least one transmit device to send an uplink signal such that each transmit device of the at least one transmit device sends an uplink signal using the configured uplink wavelength.

When performing the step of preprocessing the uplink signals, to generate a DOCSIS frame, the processor further performs the following steps: separating the uplink signals according to at least one type of uplink wavelength, converting each separated uplink signal into a radio frequency signal, and combining all converted radio frequency signals into an electrical domain signal, and demodulating the electrical domain signal to obtain the DOCSIS frame.

When performing the step of detecting that a signal conflict exists in the DOCSIS frame, the processor further performs the following step, when detecting that exception information occurs on an uplink channel used for transmitting the uplink signals, determining that a signal conflict exists in the DOCSIS frame, where the exception information includes modulation error ratio degradation, or an increase in a packet loss rate or the like.

When performing the step of allocating, to the signal groups, uplink signals that have a same uplink wavelength and cause the signal conflict, the processor further performs the following steps acquiring, according to the signal conflict, the uplink signals that have a same uplink wavelength, and allocating the uplink signals that have a same uplink wavelength to different signal groups, and acquiring the signal groups that have undergone allocation.

When performing the step of performing scheduling on the uplink signals according to the signal groups that have undergone allocation, the processor further performs the following step of scheduling an uplink bandwidth resource according to the signal groups that have undergone allocation, and allocating the scheduled uplink bandwidth resource to CMs corresponding to the uplink signals.

In this embodiment of the present disclosure, uplink signals sent by at least one transmit device are received, and scheduling is performed on the uplink signals according to signal groups such that multiple uplink signals are allowed to be received simultaneously at any time, and a transmit device uses a wavelength tunable laser or uses a colored laser, which increases tunability of an uplink wavelength of an uplink signal sent by the transmit device, and avoids a conflict between uplink signals to the greatest extent, thereby better ensuring normal communication on an uplink channel.

An embodiment of the present disclosure further provides an uplink signal scheduling system, which may include at least one transmit device and the processing device according to the embodiment shown in FIG. 3 to FIG. 6, or may include at least one transmit device and the processing device according to the embodiment shown in FIG. 7, where the transmit device is configured to send uplink signals to the processing device such that the processing device preprocesses the uplink signals, to generate a DOCSIS frame such that when detecting that a signal conflict exists in the DOCSIS frame, the processing device creates at least two signal groups according to the uplink signals, and allocates, to the at least two signal groups, uplink signals that have a same uplink wavelength and cause the signal conflict, and the processing device performs scheduling on the uplink signals according to the signal groups that have undergone allocation, where the transmit device is an R-ONU that uses a wavelength tunable laser or an R-ONU that uses a colored laser.

It should be noted that the transmit device may be an R-ONU that uses a wavelength tunable laser or an R-ONU that uses a colored laser. The transmit device may work in a burst mode, or may work in a continuous mode. A burst mode indicates that multiple R-ONUs may share one uplink wavelength, and a continuous mode indicates that one R-ONU can occupy only one specific uplink wavelength. In the burst mode, although a length of a CP of an OFDM uplink signal and a length of a preamble of an SC-QAM uplink signal are limited, compared with the continuous mode, using the burst mode can effectively reduce a signal-to-noise ratio of an uplink channel.

The wavelength tunable laser may include a DFB laser or a DBR laser. The colored laser may include a CWDM laser, or a DWDM laser. Costs of using a CWDM laser are lower than costs of using a DWDM laser, a DFB laser, or a DBR laser, where the DFB laser and the DBR laser are both wavelength tunable lasers. A wavelength tunable range (where each degree Celsius corresponds to a wavelength shift of 0.1 nm) of 3 nm to 4 nm can be achieved by controlling an operating temperature of the DFB laser. The DBR has a wavelength tunable range of about 10 nm.

In this embodiment of the present disclosure, uplink signals sent by at least one transmit device are received, and scheduling is performed on the uplink signals according to signal groups such that multiple uplink signals are allowed to be received simultaneously at any time; and a transmit device uses a wavelength tunable laser or uses a colored laser, which increases tunability of an uplink wavelength of an uplink signal sent by the transmit device, and avoids a conflict between uplink signals to the greatest extent, thereby better ensuring normal communication on an uplink channel.

With descriptions of the foregoing embodiments, a person skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation. The computer-readable medium may include a random-access memory (RAM), a read-only memory (ROM), an electrically erasable programmable read-only memory (EEPROM), a compact disc read-only memory (CD-ROM), or another optical disc storage or a disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in definition of a medium to which they belong. For example, a disk and disc used by the present disclosure includes a compact disc (CD), a laser disc, an optical disc, a digital versatile disc (DVD), a floppy disk and a Blu-ray® disc, where the disk generally copies data by a magnetic means, and the disc copies data optically by a laser means. The foregoing combination should also be included in the protection scope of the computer-readable medium.

What is disclosed above is merely exemplary embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. An uplink signal scheduling method, comprising:
preprocessing uplink signals, to generate a data over cable service interface specification (DOCSIS) frame when the uplink signals sent by at least one transmit device are received, wherein the DOCSIS frame comprises at least two uplink signals, and wherein each uplink signal of the at least two uplink signals corresponds to one uplink wavelength;
determining that a signal conflict exists in the DOCSIS frame when exception information occurs on an uplink channel used for transmitting the uplink signals, wherein the exception information comprises modulation error ratio degradation or an increase in a packet loss rate;
creating at least two signal groups according to the uplink signals when it is detected that the signal conflict exists in the DOCSIS frame;
acquiring, according to the signal conflict, uplink signals that have a same uplink wavelength;
allocating the uplink signals that have the same uplink wavelength and cause the signal conflict to different signal groups of the at least two signal groups;

acquiring the signal groups that have undergone allocation; and performing scheduling on the uplink signals according to the signal groups that have undergone allocation.

2. The method according to claim 1, wherein before receiving uplink signals sent by the transmit device, the method further comprises configuring an uplink wavelength for each transmit device to send the uplink signal such that each transmit device sends the uplink signal using the configured uplink wavelength.

3. The method according to claim 1, wherein preprocessing the uplink signals, to generate the DOCSIS frame comprises:
separating the uplink signals according to at least one type of uplink wavelength;
converting each separated uplink signal into a radio frequency signal;
combining all converted radio frequency signals into an electrical domain signal; and
demodulating the electrical domain signal to obtain the DOCSIS frame.

4. The method according to claim 1, wherein performing scheduling on the uplink signals according to the signal groups that have undergone allocation comprises:
scheduling an uplink bandwidth resource according to the signal groups that have undergone allocation; and
allocating the scheduled uplink bandwidth resource to cable modems (CMs) corresponding to the uplink signals.

5. A processing device, comprising:
a memory; and
a processor coupled to the memory, wherein the processor is configured to:
preprocess uplink signals when the uplink signals sent by at least one transmit device are received;
generate a data over cable service interface specification (DOCSIS) frame, wherein the DOCSIS frame comprises at least two uplink signals, and wherein each uplink signal of the at least two uplink signals corresponds to one uplink wavelength;
determine that a signal conflict exists in the DOCSIS frame when exception information occurs on an uplink channel used for transmitting the uplink signals, wherein the exception information comprises modulation error ratio degradation or an increase in a packet loss rate;
create at least two signal groups according to the uplink signals when it is detected that the signal conflict exists in the DOCSIS frame;
acquire, according to the signal conflict, uplink signals that have a same uplink wavelength;
allocate the uplink signals that have the same uplink wavelength and cause the signal conflict to different signal groups of the at least two signal groups;
acquire the signal groups that have undergone allocation; and
perform scheduling on the uplink signals according to the signal groups that have undergone allocation.

6. The processing device according to claim 5, wherein the processor is further configured to configure an uplink wavelength for each transmit device to send an uplink signal such that each transmit device sends the uplink signal using the configured uplink wavelength.

7. The processing device according to claim 5, wherein the processor is further configured to:

separate the uplink signals according to at least one type of uplink wavelength when the uplink signals sent by the at least one transmit device are received;
convert each separated uplink signal into a radio frequency signal;
combine all converted radio frequency signals into an electrical domain signal; and
demodulate the electrical domain signal to obtain the DOCSIS frame.

8. The processing device according to claim 5, wherein the processor is further configured to:
schedule an uplink bandwidth resource according to the signal groups that have undergone allocation; and
allocate the scheduled uplink bandwidth resource to cable modems (CMs) corresponding to the uplink signals.

9. A processing device, comprising:
a receiver; and
a processor coupled to the receiver and configured to:
preprocess uplink signals to generate a data over cable service interface specification (DOCSIS) frame when controlling the receiver to receive the uplink signals sent by at least one transmit device, wherein the DOCSIS frame comprises at least two uplink signals, and wherein each uplink signal corresponds to one uplink wavelength;
determine that a signal conflict exists in the DOCSIS frame when exception information occurs on an uplink channel used for transmitting the uplink signals, wherein the exception information comprises modulation error ratio degradation or an increase in a packet loss rate;
create at least two signal groups according to the uplink signals when the signal conflict exists in the DOCSIS frame;
acquire, according to the signal conflict, uplink signals that have a same uplink wavelength;
allocate the uplink signals that have the same uplink wavelength and cause the signal conflict to different signal groups of the at least two signal groups;
acquire the signal groups that have undergone allocation; and
perform scheduling on the uplink signals according to the signal groups that have undergone allocation.

10. An uplink signal scheduling system, comprising:
at least one transmit device configured to send uplink signals and comprising a radio frequency over glass-optical network unit (R-ONU) that uses a distributed feedback (DFB) laser, a distributed Bragg reflector (DBR) laser, or a colored laser; and
a processing device configured to receive the uplink signals from the at least one transmit device and comprising:
a receiver; and
a processor coupled to the receiver and configured to:
preprocess the uplink signals to generate a data over cable service interface specification (DOCSIS) frame;
determine that a signal conflict exists in the DOCSIS frame when exception information occurs on an uplink channel used for transmitting the uplink signals, wherein the exception information comprises modulation error ratio degradation or an increase in a packet loss rate;
create at least two signal groups according to the uplink signals;
acquire, according to the signal conflict, uplink signals that have a same uplink wavelength;

allocate the uplink signals that have the same uplink wavelength and cause the signal conflict to different signal groups of the at least two signal groups;
acquire the signal groups that have undergone allocation; and
perform scheduling on the uplink signals according to the signal groups that have undergone allocation.

\* \* \* \* \*